United States Patent
Patel

(10) Patent No.: US 9,506,729 B2
(45) Date of Patent: Nov. 29, 2016

(54) FIELD MIXABLE TWO-COMPONENT LIQUID EXPLOSIVE

(71) Applicant: The United States of America, as represented by the Secretary of the Army, Washington, DC (US)

(72) Inventor: Divyakant L. Patel, Woodbridge, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 14/867,236

(22) Filed: Sep. 28, 2015

(65) Prior Publication Data

US 2016/0116259 A1     Apr. 28, 2016

Related U.S. Application Data

(62) Division of application No. 14/186,162, filed on Feb. 21, 2014, now Pat. No. 9,175,933.

(51) Int. Cl.
*F41F 5/00*     (2006.01)
*F41H 11/12*    (2011.01)
(Continued)

(52) U.S. Cl.
CPC .............. *F41H 11/12* (2013.01); *C06B 23/002* (2013.01); *C06B 25/00* (2013.01); *C06B 25/36* (2013.01); *C06B 47/00* (2013.01); *F16M 11/043* (2013.01);
(Continued)

(58) Field of Classification Search
CPC ..... F41H 11/12; C06B 23/002; C06B 25/00; C06B 25/36; C06B 47/00; F16M 11/043; F42B 3/00; F42B 3/10; F42B 3/26; F42B 12/207
See application file for complete search history.

(56) References Cited

U.S. PATENT DOCUMENTS 2,261,788 A * 11/1941 Wyler .................. C07C 201/12
                                                       568/712
2,449,040 A *  9/1948 Schideler ............ C07D 487/18
                                                       422/163
(Continued)

FOREIGN PATENT DOCUMENTS

WO       2012/034182 A1    3/2012

OTHER PUBLICATIONS http://www.humanitariandemining.org/2010Design/resources/MNS_Report.pdf.

*Primary Examiner* — Samir Abdosh
(74) *Attorney, Agent, or Firm* — Richard J. Kim

(57) ABSTRACT

A low-cost, reliable and easy to use kit for neutralizing surface exposed landmine and unexploded ordnance for humanitarian demining is based on a liquid fuel and a solid/soluble fuel. Both fuels are premeasured in separate, sealed containers. The addition of a small quantity of solid/soluble fuel into the liquid creates an explosive. The resulting mixture is capable of detonating with a standard No. 8 blasting cap. The solid/soluble fuel can be in the form of a powder, tablet, or its saturated solution in water. The solid/soluble fuel is hexamethylenetetramine. The liquid fuel, nitromethane, is provided in premeasured quantities. User is provided instructions for choosing the appropriate quantity of liquid fuel, the corresponding solid/soluble fuel required, the method of mixing, placement and detonation of the kits. Also disclosed is a simple wooden stand to hold the bottle of explosive in place. A special fuel, liquid 2-ethylhexylnitrate, is provided to desensitize the mixed and sensitized explosive.

6 Claims, 8 Drawing Sheets

(51) Int. Cl.
*C06B 47/00* (2006.01)
*C06B 25/00* (2006.01)
*C06B 23/00* (2006.01)
*F42B 3/10* (2006.01)
*F42B 3/00* (2006.01)
*F42B 3/26* (2006.01)
*F42B 12/20* (2006.01)
*C06B 25/36* (2006.01)
*F16M 11/04* (2006.01)

(52) U.S. Cl.
CPC . *F42B 3/00* (2013.01); *F42B 3/10* (2013.01); *F42B 3/26* (2013.01); *F42B 12/207* (2013.01)

(56) References Cited

U.S. PATENT DOCUMENTS

| | | | |
|---|---|---|---|
| 2,656,355 A * | 10/1953 | Bachmann | C07D 487/08 544/215 |
| 2,775,571 A * | 12/1956 | Buckmann | C08G 12/22 208/1 |
| 2,925,038 A | 2/1960 | Walker | |
| 3,133,844 A | 5/1964 | Royer et al. | |
| 3,239,395 A | 3/1966 | Laurence | |
| 3,309,251 A | 3/1967 | Audrieth et al. | |
| 3,338,165 A | 8/1967 | Minnick | |
| 3,454,438 A | 7/1969 | Simpson et al. | |
| 3,630,281 A | 12/1971 | Fast et al. | |
| 3,637,445 A | 1/1972 | Newman | |
| 3,718,512 A | 2/1973 | Hurst | |
| 3,722,410 A | 3/1973 | Hurst | |
| 3,724,319 A | 4/1973 | Zabelka et al. | |
| 3,794,534 A | 2/1974 | Chandler et al. | |
| 3,832,950 A | 9/1974 | Hurst | |
| 3,915,768 A | 10/1975 | Runge et al. | |
| 3,926,119 A | 12/1975 | Hurst et al. | |
| 3,980,510 A | 9/1976 | Ridgeway | |
| 4,046,055 A | 9/1977 | McDanolds et al. | |
| 4,076,562 A | 2/1978 | Forsythe | |
| 4,253,889 A | 3/1981 | Maes | |
| 4,315,784 A | 2/1982 | Hattori et al. | |
| 4,493,239 A | 1/1985 | Pedersen | |
| 4,822,433 A * | 4/1989 | Cooper | C06B 47/145 149/108.8 |
| 4,823,672 A | 4/1989 | Eidelman | |
| 4,892,597 A | 1/1990 | Sullivan, Jr. | |
| 4,967,636 A | 11/1990 | Murray et al. | |
| 5,014,623 A | 5/1991 | Walker et al. | |
| 5,099,763 A | 3/1992 | Coursen et al. | |
| 5,140,891 A | 8/1992 | Husseiny et al. | |
| 5,140,908 A | 8/1992 | Sullivan, Jr. | |
| 5,226,986 A | 7/1993 | Hansen et al. | |
| 5,648,636 A * | 7/1997 | Simpson | A01K 15/02 102/355 |
| 5,929,363 A | 7/1999 | Neff et al. | |
| 5,936,184 A | 8/1999 | Majerus et al. | |
| 5,970,841 A | 10/1999 | Trocino | |
| 6,007,648 A | 12/1999 | Sullivan, Jr. et al. | |
| 6,112,633 A | 9/2000 | Trocino | |
| 6,232,519 B1 | 5/2001 | Eidelman et al. | |
| 6,235,132 B1 * | 5/2001 | Knowlton | B60R 21/264 149/19.7 |
| 6,298,763 B1 | 10/2001 | Greenfield et al. | |
| 6,405,627 B1 | 6/2002 | Anderson | |
| 6,453,788 B1 | 9/2002 | Lebet et al. | |
| 6,484,617 B1 | 11/2002 | Anderson et al. | |
| 6,546,838 B2 | 4/2003 | Zavitsanos et al. | |
| 6,679,176 B1 | 1/2004 | Zavitsanos et al. | |
| 6,691,622 B2 | 2/2004 | Zavitsanos et al. | |
| 6,960,267 B1 * | 11/2005 | Nixon, III | C06B 25/36 149/109.6 |
| 7,331,268 B1 | 2/2008 | Pangilinan et al. | |
| 9,175,933 B2 * | 11/2015 | Patel | F41H 11/12 |
| 2008/0131350 A1 * | 6/2008 | Burkes | B82Y 30/00 423/409 |
| 2015/0241179 A1 * | 8/2015 | Patel | F41H 11/12 89/1.13 |
| 2016/0116259 A1 * | 4/2016 | Patel | F41H 11/12 89/1.13 |

* cited by examiner

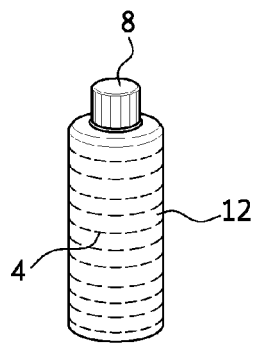
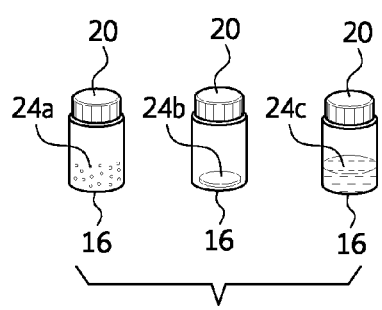
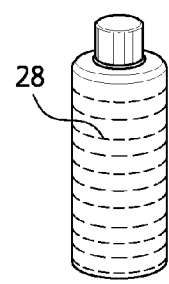
FIGURE 1A        FIGURE 1B        FIGURE 1C
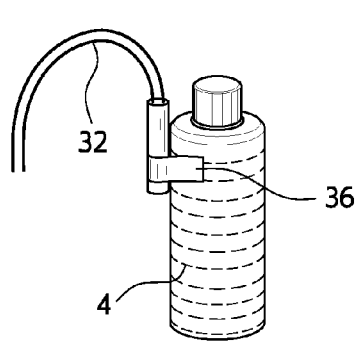
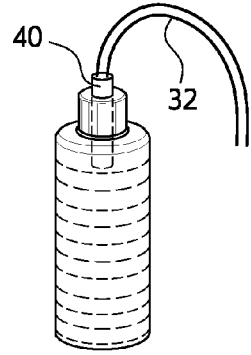
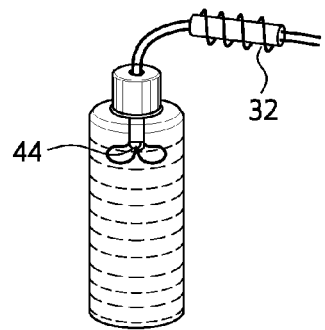
FIGURE 1D        FIGURE 1E        FIGURE 1F

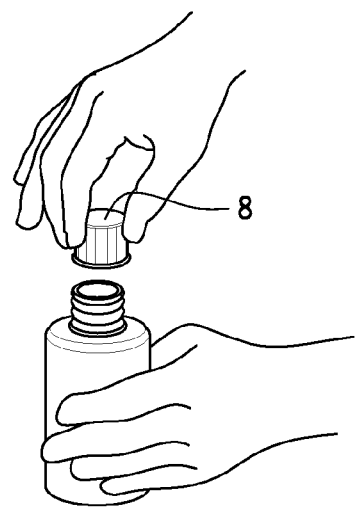
FIGURE 4A FIGURE 4B
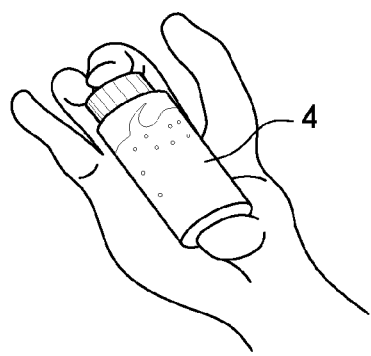
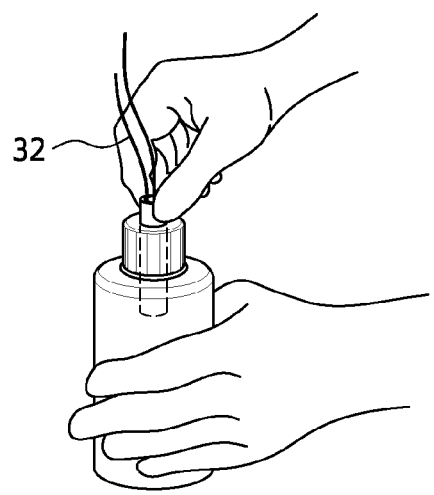
FIGURE 4C FIGURE 5

FIELD MIXABLE TWO-COMPONENT LIQUID EXPLOSIVE

REFERENCE TO RELATED APPLICATIONS

This is a divisional patent application of copending application Ser. No. 14/186,162, filed Feb. 21, 2014, entitled "Simple Low-Cost Hand-Held Landmine Neutralization Device." The aforementioned application is hereby incorporated herein by reference.

GOVERNMENT INTEREST

The invention described herein may be manufactured, used, sold, imported, and/or licensed by or for the Government of the United States of America.

FIELD OF THE INVENTION

The present invention relates to a low-cost, hand-held device and method for the safe and effective neutralization of surface-exposed landmines and unexploded ordnance for humanitarian and military applications during peace time. The present invention relates, in general, to explosives and landmines kits for humanitarian demining.

BACKGROUND OF THE INVENTION

A landmine is a deadly effective explosive device and serves as a living soldier at far cheaper costs. There are two general categories of mines, Anti-tank (AT) and Anti-personnel (AP). They are further classified according to the case material (metal, plastic and wood) and fuse type. AP mines were developed during WWII to protect AT mines from mine detection and removal. Unfortunately, AP and AT mines remain in the ground after a conflict ends. According to the 2008 Landmine Monitor Report, an estimated 45 to 50 million emplaced landmines in over 78 countries kill or maim more than 6,000 people annually. An international humanitarian demining effort is underway to address this global problem. In manual demining the first step is to detect landmines with probe, metal detectors and/or dogs. Once a mine is detected, the next step is to remove the soil overburden. Once the mine's surface is exposed, one can identify the type of case and mine, and use the proper disposal method.

At present two techniques are used by deminers to clear, or neutralize, individual mines in situ, manual clearance and destruction (demolition). In manual clearance the mine is carefully dismantled. Manual clearance can be a very difficult, slow, tedious and hazardous operation. Mines may behave unpredictably due to corrosion or other forms of weathering, or may be booby-trapped with anti-lift devices. The second mine neutralization technique, demolition, is achieved with high explosives like C-4 or TNT. Unfortunately, this approach has significant hindrance such as safety, cost, effective destruction, storage, transportation, and training. Furthermore, maintaining a secure logistic chain is essential in the era of global terrorism.

Several innovative non-explosive low order (burning the mine's explosive rather than initiating it in a blast) and high order (demolition) systems have been developed by scientist at the U.S. Humanitarian Demining Research and Development Program in the past 15 years. The low order systems include the chemical-filled projectile, reactive metal projectile, propellant torch (PT-1 and PT-12), thermite torch, and mine incinerator. The high order binary mixture systems are NMX Foam and Liquid Explosive Pouch. Each low-order system except PT-12 is only applicable to thin case AP and AT mines and is not applicable to unexploded ordnance (UXO) and they are costly. The high-order systems neutralize mines and UXO but require more than one device or a larger quantity of the binary mixture, thus increasing the cost per mine or UXO for neutralization.

The ideal method of neutralization is a non-explosive single chemical device that provides safer, faster, more reliable and less expensive means for mine neutralization in humanitarian demining operations. The subject invention fills this need with a device based on flammable liquid nitromethane (NM) and solid fuel hexamine.

Description of Related Art on Sensitizers of Nitromethane

Nitromethane, a flammable liquid, in pure form is difficult to detonate unless it is highly confined or its temperature is raised in a confined state. However, explosive compositions comprising NM and a sensitizer for NM are well in the art. These compositions are formed by combining NM with a sensitized liquid chemical compound as disclosed in U.S. Pat. Nos. 3,239,395; 3,309,251 and 3,454,438. Various chemical compounds serve as effective sensitizers for NM. For example, U.S. Pat. No. 3,239,395 by Edgar Laurence et al. identifies liquid explosive compositions containing NM sensitized with liquid amines from the aromatic and aliphatic groups such as aniline, diphenylethylenediamine, phenylbetanaphthylamine and diethylamine, tetraethylene pentamine, and morpholine. Mr. Laurence points out that the aliphatic amines, particularly diethylamine, have been found to be especially effective. These amines have the effect of increasing enormously the explosive power of nitromethane. A small percentage of any of these amines, around 2% by volume, when added to the nitromethane produce an explosive that is sensitive enough to initiate by a standard No. 8 blasting cap. Likewise U.S. Pat. No. 3,309,251 by Ludwig Audrieth et al. discloses a new liquid explosive mixture containing nitromethane and ethylenediamine (EDA) diluted with any of the non-explosive compounds such as glycerin or ethylalcohol or ethylcellulose that can be detonated with a standard military blasting cap in an unconfined state. In theory the mixtures can be applicable for minefield clearance and demolition. In practice, however, the mixture is not effective, not reliable and costly. As a result it cannot be applicable to humanitarian demining (HD).

U.S. Pat. No. 3,133,844 by Thurber W. Royer et al. discloses ammonium nitrate explosives containing nitroalkanes. The liquid explosive composition comprises prills ammonium nitrate saturated with liquid hydrocarbon, liquid nitromethane and coupling agent acetone (ketone). NM is a preferred nitroalkane sensitizer since it has been found that the explosive compositions produced by this compound have a higher brisance than other explosive compositions containing higher nitroalkanes (nitroethane, nitropropane, etc.). This non-explosive system comprises four components; therefore it is a costly liquid explosive composition not suitable for HD usage.

U.S. Pat. No. 3,338,165 by Minnick uses insoluble air-entrapping materials, such as resin balloons, that can be uniformly suspended in gelled nitromethane and thereby rendering it sensitive to detonation by strong shock. It is necessary to gel the NM because otherwise the air-entrapping material will segregate, whereupon the composition loses its sensitivity to strong shock and does not detonate when the initiator is fired. The compositions disclosed by Minnick are satisfactory when freshly prepared but they suffer from several disadvantages for field use by deminers. It is inconvenient, if not impossible, to gel the NM at the site of use and to uniformly mix in the air-entrapping material. It is time consuming and the gel is sensitive to temperature. Furthermore, once the composition has been prepared, it cannot be easily desensitized if it is not used promptly. This is not a good solution for HD.

U.S. Pat. No. 3,454,438 by Robert Simpson discloses sensitized nitromethane with nitric acid and converted mixture into gel that can be detonated by No. 8 electric blasting cap. Nitric acid is a corrosive, irritant, and permeator. This is not a good solution for HD.

O. Wayne Chandler et al. provide a method for sensitization of NM in U.S. Pat. No. 3,794,534 with a foam and microspheres of air. According to the invention, when NM is to be detonated, the polymeric foam containing microspheres of entrapped air is placed in intimate contact with a suitable shock-producing device, e.g., an electric blasting cap. The cap and foam is then placed in intimate contact with the NM, e.g., by immersing, or by placing in a cap-well or tube and then immersing. When the cap is fired, it results in detonation of the NM. The polymeric foam is polyurethane foam, and the microspheres are made of glass or ceramic. The preferred method of preparing the primer is to shake or tumble relatively thin pieces or shreds of the foam with the microspheres. Unfortunately it is not commercially available; one has to synthesize polyurethane foam with 15-85% glass microspheres, an expensive task.

U.S. Pat. No. 3,832,950 by Gerald L. Hurst discloses the inverted bottle arming technique, which relates to a method of intermixing a liquid and a solid component, which separately are non-explosive, but when intermixed are rendered highly explosive. The technique was developed for demolition purposes and is not applicable to HD.

Wallace F. Runge et al. in U.S. Pat. No. 3,915,768 disclose sensitized nitromethane. They use various solid amine salts of aliphatic and aromatic compounds. They did not add amine salts directly into NM liquid, instead dissolve amine salts into solvents such as lower aliphatic alcohols, i.e., methanol, ethanol or propanol. Preferably it is a two step process, dissolve amine salts in solvent, and then add solution to NM. The solid amines salts are not commercially available and the solvent reduces the power of NM. Therefore it is a not a good system for HD.

U.S. Pat. No. 3,926,119 by Gerald L. Hurst et al. discloses an explosive device based on a two-component liquid-solid explosive from non-explosive chemicals and it provides a novel demolition device that is detonable by a No. 6 blasting cap. The device is used in seismic work, blasting in bore holes and ditching. It was not designed for land mine neutralization.

U.S. Pat. No. 3,980,510 by John J. Ridgeway discloses sensitization of nitromethane with hydrazine and uses diethylene triamine (DETA) as a delayed action sterilizing agent in the composition. Hydrazine is a liquid, toxic and corrosive.

U.S. Pat. No. 4,076,562 by Richard Forsythe discloses an explosive composition with Adhered Air Entrapping Material. NM will be sensitized by microspheres that are made up of very small, hollow glass or hollow ceramic (air entrapment material). A polyurethane foam containing glass bubbles is used for sensitizing NM. This mixture has less power and the required special synthesis of polymer is costly for HD.

U.S. Pat. No. 4,253,889 by Michel Maes discloses the two-component explosive composition. The mixture comprises granular ammonium nitrate and 1:1 volume ratio of nitro-aliphatic hydrocarbon nitromethane and non-self reacting hydrocarbon trichloroethane. The three-component explosive composition remains cap sensitive to a No. 6 blasting cap. Though each component of the three component mixture is non-detonable in and of itself, it is still costly.

U.S. Pat. No. 4,892,597 by John D. Sullivan Jr. discloses dissolved trinitrotoluene (TNT) in sensitized nitromethane. The liquid mixture contains NM, TNT and pyridine, weight ratio of about 60-64 parts NM, 34-29.5 parts TNT and 6-6.5 parts pyridine. The density of the mixture is about 1.282 g/mL. The density is higher than pure NM (1.14 g/mL). The mixture performs little better than sensitized NM. However, the mixture is not suitable for HD because this mixture uses TNT explosive, toxic liquid pyridine, and is time consuming for preparing the mixture (TNT is difficult to dissolve in NM, but soluble in pyridine).

U.S. Pat. No. 5,014,623 by Evan Walker et al. discloses the binary munitions system. The system comprises at least two non-explosive ingredients that combine in flight to form a relatively safe explosive. The binary mixture cannot be applicable to HD due to cost and availability of ingredients.

U.S. Pat. No. 5,140,908 by John Sullivan Jr., discloses the liquid explosive with initiator. The liquid organic explosive mixture consisting of a mono-nitromethane, picric acid and morpholine as a sensitizer in the percent by weight basis (70/24/6), respectively, is prepared using commercial grade reactants (chemicals) at room temperature. The liquid mixture showed a detonation 20% more powerful compared to only sensitized NM. Because the liquid mixture contains the explosive chemical picric acid, shipping is difficult and not applicable for HD.

U.S. Pat. No. 5,226,986 by Gary Hanson et al. discloses the formulation of multi-component explosive. The multi-component explosive is composed of non-detonable components comprising aluminum fuel granules and oxidizing liquid—a mixture of nitromethane and nitroethane. More than 5% of aluminum granules are needed to sensitize NM and its reduces the power of NM. Also, nitroethane reduces the power of NM.

U.S. Pat. No. 6,007,648 by John D Sullivan, Jr. discloses the liquid explosive composition. The liquid explosive composition is composed of NM, NM sensitizer morpholine, and energetic compounds from aliphatic nitro hydrocarbon compounds. The preferred volume ratio of the NM/morpholine/energetic compound is 72/4/24, respectively. This (novel) composition forms a liquid explosive composition more powerful than sensitized NM alone. However, the liquid mixture cannot be applicable to HD because it is costly and uses energetic liquid, which is difficult to transport.

The disadvantages of liquid type sensitizers lies in the hazardous nature of the EDA or DETA or pyridine ingredient and the health hazard associated with the vapors given off by these sensitizers. It would be desirable, therefore, if a low-cost, safe and non-toxic substitute sensitizer could be found for NM that might also be of use in a wide range of explosive types. An ideal solid non-explosive sensitizing material would provide the following advantages over liquid amines sensitizers:

1. Safe manufacturing, transportation
2. Immune to explosion
3. Very benign producing lower environmental impact
4. Lower development and operating costs
5. Lower fire and explosion hazards
6. Less complex design and potentially higher reliability Description of Related Art on Landmine and UXO Neutralization Devices and Kits U.S. Pat. No. 2,925,038 by Brooks Walker discloses the Method of Clearing Mine Fields. The large scale mine clearing method uses binary liquids mixed or separate liquids combined at the nozzle that can be sprayed over a large buried mine field area and detonated. This system is entirely unsuitable for field use, in particular for clearing individual mines in HD. In addition the method is very costly, unreliable and environmentally unsafe.

For the user who needs small quantities to do a job, "binary" or "two-part" explosives are available. One popular brand is Kinepak. It appears that this product is based on U.S. Pat. No. 3,718,512 by Hurst. As described in the Hurst patent and embodied in the commercially available product Kinepak, two individual, non-explosive components are combined by the user to form a cap sensitive explosive. The first component, referred to as "the liquid" is predominantly nitromethane (NM). The other component, referred to as "the solid" is primarily finely divided ammonium nitrate (AN). The commercial product Kinepak is packaged in several different sizes and shapes of plastic bottles, as well as foil pouches (bags) which are intended for various applications. In each case, the solid component container is supplied with an appropriate amount of premeasured liquid in another individual container.

The liquid component of the Kinepak is classified as a "Flammable Liquid" for transportation purposes. The solid component is classified as an "oxidizer". Neither is defined as an explosive for transportation or storage. In order to use Kinepak, the liquid component is simply poured into the solid component. Within about five to fifteen minutes, the liquid (red in color) will soak down to the bottom of the container, until the mixture is pink. At this point, it has the consistency of moist powder and is cap sensitive, high explosive and ready for neutralizing mines. It is costly and it takes more time for mixing.

U.S. Pat. No. 3,724,319 by Richard Zabelka et al. discloses the FAX (fuel air mixture) minefield clearance device. The invention relates to clearing of landmine areas employing an improved fuel-air cloud for producing the requisite pressure and shock wave intended to detonate the landmines by delivering only a hydrocarbon and utilizing available atmospheric oxygen to produce an explosive mixture, as distinguished from high explosive which carries both a fuel and oxidizer, thus decreasing the quantity of material to be delivered and also utilizing a material which is relatively inexpensive. However, the system works only on limited types of surface exposed mines and is unreliable, costly and complicated.

U.S. Pat. No. 4,046,055 by Richard T. McDanolds et al. discloses the apparatus for safely neutralizing explosive devices. An unknown explosive device is safely neutralized, that is, rendered inoperative, without disturbing the device by penetrating the device with an explosive driven captive projectile from a safe distance. The projectile injects liquid nitrogen into the device to cool some internal parts below the temperature at which they are operative. It is a temporary non-explosive neutralization method. It is not landmine neutralization device. Due to various case thicknesses and materials, the projectile cannot penetrate landmines. In addition, liquid nitrogen is not available in developing countries where landmines predominate, making it unsuitable for HD.

U.S. Pat. No. 4,493,239 by Marvin A. Pedersen discloses range clearance by enhancing oxidation of ferrous ordnance in-situ. The wide area to be treated is infused with an electrolyte and subjected to a direct current voltage to enhance natural corrosion in order to render ordnance inoperable. The temperature of the area also may be increased, for example, by covering the area with black material, such as a plastic sheet, to further accelerate corrosion. This method is unsatisfactory because it takes on the order of five to ten years and requires continuing attention.

U.S. Pat. No. 4,823,672 by Shmuel Eidelman discloses the apparatus and method for neutralizing mine fields. The device is a two-dimensional array or "net" of explosives that is deployed over a minefield with a rocket. Upon detonation of the explosive, a substantially uniform blast wave is created exerting uniform pressure and impulse on the minefield below. The detonation should occur substantially simultaneously so that the blast from adjacent charges will interact thereby creating a planar wave front. The device presents logistical and operational burdens unsuitable for HD. In addition, uneven terrain or physical obstacles and vegetation would render it ineffective.

U.S. Pat. No. 4,967,636 by Stephen B. Murray et al. discloses the fuel-air line-charge ordnance neutralization. The system provides for breaching a lane in minefield containing pressure sensitive mines. The system needs a mobile carrier for mounted fuel, nitrogen and water tanks, a hose magazine, detonating cord and a launch rail or tow vehicle such as a rocket. It is a non-explosive system but is expensive and applicable to surface exposed pressure fuse mines and not for blast resistance or scatterable mines. While it may have military application, the system is not for HD use.

U.S. Pat. No. 5,140,891 by Abdo A. Husseiny et al. discloses the explosive ordnance disposal and mine neutralization system, a method and apparatus for neutralizing mines and UXO by spraying cryogenic liquid over the area to be cleared, rendering the materials at least temporarily inoperable. Ordnance and mine removed by this method should be placed in liquid nitrogen as quickly as possible. This non-explosive system presents logistic problems and liquid nitrogen handling problems that are not suitable for HD.

Another known commercial product is marketed under the name Binex. It is believed to be based upon U.S. Pat. No. 5,226,986 to Hansen, et al. Binex uses a two component system of an aqueous solution of sodium perchlorate and aluminum powder. When these two components are combined, a liquid explosive is formed that is cap sensitive. It is believed that this composition would not be a viable product for mines and UXO neutralization because of the high cost, the environmental concerns and reliability for mine neutralization.

U.S. Pat. No. 5,929,363 by Helmut Neff et al. discloses the method and apparatus for destroying hidden landmines. The method of destroying hidden land mines includes creating a borehole in the ground of a mine-contaminated area; then placing in the hole a plastic tube filled with water. Positioned at end of tube are electrodes, which hold a wire extending within the liquid. The device is connected to a switchable current source and a current pulse is applied to cause a wire explosion, generating a shock wave in the ground to detonate landmines within the effective range of the shock wave. The method is unsuitable for HD as it does not generate a sufficiently intense shock wave to have sufficient range or reliability. In addition, it is expensive.

U.S. Pat. No. 5,936,184 by Mark Majerus discloses device and methods for clearance of mines or ordnance. The device comprises an explosive charge that penetrates and opens the casing of an explosive device (mine or UXO) and forces reactive material into the explosive device. The explosive in the mine or UXO burns in a low-order neutralization process. The device and methods cannot be applicable to HD because high explosive is required to initiate liner or shaped charges. The device and methods are used on limited mine targets but have never been tested on any UXO.

Another binary prototype product, known under the name "Liquid Explosive Pouch" (humanitarian demining device), is believed to be based upon U.S. Pat. No. 5,970,841 to Joseph L. Trocino. It is a binary-explosive system consisting of flexible plastic pouches (½ and 1-pound, tube-shaped) and two commercial non-explosive liquid chemicals, nitromethane and liquid amine sensitizer diethylenetriamine (DETA). Nitromethane becomes an explosive only after it has been sensitized by the addition of the DETA. A dye indicator included in the nitromethane changes to purple when the nitromethane is sensitized. Each pouch is fitted with a leak-proof, screw-on HDPE cap.

For field operations, 25 mL of DETA is injected into the pouch with a plastic syringe and then the pouch is filled with nitromethane. The mixed liquid in the pouch is cap sensitive explosive. The explosive liquid mixture is equivalent to TNT on a weight basis; it has a detonation velocity 6.4 km/s at 13 GP (130 kbr). Total cost for one pound pouch including chemicals and pouch is $3.04 with a purchase of 10,000 pouches. The device uses a corrosive liquid amine; therefore, it is difficult to handle by deminers. The pouch is elongated, requiring a higher quantity of explosive mixture to neutralize a large UXO and increasing the cost.

Another binary prototype product is known under the NMX foam (nitromethane explosive foam). It is believed to be based upon U.S. Pat. No. 6,112,633 to Joseph Trocino (disposable explosive foam dispenser). It is a binary explosive system containing two disposable aerosol cans, large and small. The large can contains nitromethane stock solution (nitromethane, surfactants, silica powder) and the small can contains a mixture of hydrocarbons (propane, butane and isobutene), which form the propellant. Before using, one would inject the propellant into the nitromethane stock container, mix the two components by shaking the container, and then spray the foam on the target. When this mixture is exposed to the atmosphere, the liquid propellant expands to a gas, producing foam with a physical consistency of shaving cream. The foam is cap sensitive explosive. Total cost of one kit is $10.00 with the purchase of 10,000 kits. Separately, both components are classified as flammable liquids for transportation and storage purposes. The foam performance depends on its density and the density can vary with application and temperature. Two cans of NMX foam are required to neutralize AT mines and the additional cost may be prohibitive to the HD user.

U.S. Pat. No. 6,232,519 B1 by Shmuel Eidelman et al. discloses the method and apparatus for mine and unexploded ordnance neutralization. It is a method for neutralization of the explosive content of mines and UXO by essentially completely consuming the explosive through combustion or decomposition before any explosion occurs. A charge of a compound that reacts with an extremely high heat-release rate is ignited on or near the casing of the device to be neutralized. The intense exothermic reaction generates high temperature combustion products that will disrupt the casing, thus leading to combustion or decomposition of the explosive. The holes melted in the mine casing enable ignition of a large area of the explosive charge and provide easy access for atmospheric air to support active burnout of the explosive. The apparatus comprises the compound that reacts with a high heat release rate, an ignition source, and a container for the assembly. Commercial products developed from the patent are costly and difficult to ship, DOT class 1.4 C. The system is not good for HD usage.

U.S. Pat. No. 6,298,763 B1 by Gary R. Greenfield et al. discloses the explosive device neutralization system. The neutralization system neutralizes explosive devices, including landmines, underwater mines, and unexploded ordnance (UXO by low-order burning). The system consists of penetrator and reactive materials such as magnesium-Teflon, thermites, and solid rocket propellants. The penetrator pierces the case of the explosive device and brings reaction initiation material in contact with the bulk charge. The reactive material renders the bulk charge non-explosive. The system is costly, not reliable and has been tested on limited explosive devices. This system is not good for HD.

Another known binary commercial product is marketed under the name FIXOR (field-friendly, inexpensive, and unexploded ordnance remover). It is believed to be based upon U.S. Pat. No. 6,405,627 by Anderson, et al. It is composed of two components contained in high-density polyethylene (HDPE) plastic bottles. One bottle contains nitroethane, a flammable liquid, and the other bottle contains mixture of the thickening agent, including fumed silica, and the sensitizing agent microspheres (microballoons). The thickening agents are considered inert powders (no shipping restrictions). The nitroethane liquid is poured into the bottle containing the mixed powder. Once shaken, the mixture becomes a detonator-sensitive 1.1 D high explosive that is equivalent to 85% of TNT by weight. The explosive self-neutralizes after a period of time depending on atmosphere temperature. It has proven effective against a wide variety of land mines and UXO. One kit is required to neutralize small mines; two kits are required to neutralize large AT mines; and at least three kits are required for a 155 mortar shell. The mixing must be done by vigorous shaking of at least 15 to 20 minutes in duration. Each kit costs $5.95 with a purchase of 100,000 kits. The system is applicable to HD but it is costly to neutralize AT mines, which require two kits, and mortar shells, which require three kits.

U.S. Pat. No. 6,453,788 B1 by Francis Lebet discloses a device for eliminating means of combat. The device is a piece of ammunition having a detonator in a plastic housing containing a hollow charge made from glass for use in the disposal/destruction of individual explosive objects such as mines or UXO. The plastic/glass casing has the advantage of not adding metal clutter to the suspect area. However, the device is not applicable to HD because the device uses HMX as a main charge and RDX or HMX as booster. The device is difficult to ship and costly and requires special storage requirements.

U.S. Pat. No. 6,484,617 B1 by Richard C. Anderson et al. discloses assembly and process for controlled burning of landmine without detonation. This invention is based on a commercial product known as the Thiokol Demining Flare. It is similar to a road flare but it generates high thrust with a high temperature flame about 2000° C. The flare uses a mixture of metal powder, metal oxide and solid propellant. The flare is ignited remotely using an electric match or time fuse. The flare is used with or without a stand. When a mine or small UXO is to be neutralized, the front of the flare is placed 1 to 3 cm from the casing. Once the flare is ignited, the flame penetrates the mine case and begins to burn the explosive. The burning time of the mine depends on the type of mine, case type, amount of explosive and type of explosive. The flare has limited applications, neutralizing AT mines with metallic cases and some plastic case blast AP mines. The cost per flare is $10.00 with the purchase 10,000 units; shipping cost is not included. It is DOT class 1.4 C. Still it is costly for HD with a limited usage.

U.S. Pat. Nos. 6,546,838 B2, 6,679,176 B1 and 6,691,622 B2 by Peter D. Zavitsanos et al. disclose reactive projectiles for exploding unexploded ordnance and reactive projectiles, delivery devices therefor, and methods for their use in the destruction of unexploded ordnance. The present research provides an effective mine destroying projectile that fully neutralizes surface exposed or buried in soils or underwater mines with fast deflagration using a delivery system. This non-explosive system is not suitable for HD due to various types of cases and thickness of mines. In addition, the system is not reliable and is costly.

Another known binary commercial product is marketed under the name HELIX (high energy liquid explosive). It is believed to be based upon U.S. Pat. No. 6,960,267 B1 to William P. Nixon, III. It is composed of two components contained in HDPE plastic bottles. One bottle contains 136 g of nitromethane, a flammable liquid, and the other bottle contains 34 g of non-explosive solid aluminum powder with stearic acid. The nitromethane liquid is poured into the bottle containing treated aluminum powder in stearic acid. After vigorous shaking, the mixed liquid is a cap sensitive explosive known as HELIX. The HELIX is poured into the shaped-charge container for use against mine or UXO targets. Total cost for one kit with shaped charge is $11.51 with a purchase of 100,000 kits. The system is too costly to be used in HD.

U.S. Pat. No. 7,331,268 B1 by Gerardo I. Pangilinan discloses explosive neutralization method and device. The neutralization device creates plasma by activating high energetic materials such RDX, HMX, TNT, or mixtures that create high velocity shock waves and temperature. The gas molecules in the energy focusing guide interact with a high velocity shock wave and temperature creating plasma. The plasma penetrates the mine or UXO case and interacts with the explosive contained, neutralizing the mine or UXO by deflagration. This system has shown feasibility in one laboratory experiment on a surrogate mine, but has never been tested in a minefield. The system cannot be applicable for HD because it is not reliable, uses high explosive and may be very costly.

The current device offers significant advantages over currently available liquid, liquid-liquid sensitizer, liquid inert sensitizer, liquid solid mixtures and solid systems. Various attempts have been made to provide a reliable, effective, low-cost explosive suitable for use in neutralization, per se, or as a sensitizing agent of use in manufacture of a broad range of explosive compositions and which avoid the use of liquid amines such as, EDA, DETA or pyridine. To date many techniques have been suggested (patented as described above) or developed to improve the neutralization of landmines and UXO by low and high order. However, all these techniques suffer important shortcomings, including performance unreliability, difficulty of use and high cost.

SUMMARY OF THE INVENTION

In order to overcome all of the drawbacks and problems described above, it is an object of our invention to provide a low-cost, multipurpose, binary liquid explosive that is cheap, effective per cost of explosive device, but at the same time has properties which make it useful for applications performed by C-4 or TNT blocks or any other mine neutralization devices. It is a further object of the invention to provide an explosive composed of ingredients which in themselves are not explosives so that they can be shipped and stored as flammable liquid and flammable soluble solid. A still further object of the invention is to provide an explosive that does not require a sensitive high explosive booster. Another object of the invention is to provide a method for mixing that can be readily practiced in the field by an inexperienced deminer.

The present invention provides a binary explosive having the following properties: After adding powder or tablet or saturated solution in water and mixing, it would be clear yellow liquid. The individual components are not classified as explosives. The components are not too dangerous or toxic to handle safely during the mixing. The components have an excellent shelf life under non-ideal storage conditions. After mixing, the explosive is stable and usable after extended time and at a broad temperature range. The kit is easy and quick to mix and the mixture is sensitive to electric blast cap and detonation cord. The mixture is detonable for a long time without additional shaking.

The first objective of the present invention is to fully neutralize all types of mines on surface buried or above ground (stake and directional mines) and UXO using a single device. The second objective of the current invention is a device containing a binary mixture (main component is 99% and the second component is less than 1%), and a separate component that is not an explosive. The third objective for the system is that it can be used with or without an included stand. The fourth objective is the device is universally effective, independent of type of mine, type of explosive fill, mine size and case types and thickness. The fifth objective is that both chemicals are available commercially, are low-cost and may be shipped and stored as non-explosives. The sixth objective is that any mixed explosive that remains unused can be easily desensitized and rendered undetonable.

The above objectives are achieved by providing a kit of reasonable containers with binary explosive components in premeasured amounts; instruction; and desensitizer for HD operations and UXO clearance. The test comprises a first sealed container having an opening means, and a premeasured amount of liquid NM contained therein. A second sealed container having a resealing means contains powder or fuel tablets or saturated solution in water to sensitize the NM. Upon dissolving the sensitizer in the liquid NM, the mixture can be detonable with No. 8 blasting cap.

The first sealed container is a commercially available plastic bottle and said opening means is a screw cap, in 2 oz. 4 oz., 8 oz. sizes.

In one embodiment, said second resealable container is a plastic or glass vial that is commercially available. In another embodiment, said second resealable container is a commercially available small plastic or glass vials and said resealing means is a lid or screw cap.

Conveniently, said premeasured amount of liquid NM is substantially 70 g, 140 g, and 280 g in the 2 oz., 4 oz., and 8 oz. bottles, respectively.

Conveniently, said initiation system comprises an electric cap, time fuse, shock tube, a detonation cord and blasting cap No. 8.

In one embodiment, said sensitizer is selected from the group of solid cyclic aliphatic amines.

The present invention provides a solid/soluble sensitizer that sensitizes nitroalkanes liquids from flammable liquids to explosive liquids for the neutralization of landmines and UXO. The solid/soluble sensitizer is selected from solid cyclic aliphatic amines, 1,4-diazobicyclo[2,2,2]octane (DBCO), 4,4'-diaminodicyclohexylmethane, hexamethylene tetramine (HMTA), piperazine anhydrous and combinations thereof, and the liquid selected from nitroalkanes is nitromethane, nitroethane and nitropropane, wherein the sensitizer is always present around 1% with respect to the liquid. The most preferred solid sensitizer is hexamethylene tetramine and most preferred liquid is nitromethane (NM). NM used in present investigation contains Thymol blue, a sensitive indicator dye for sensing basic compound. When a small quantity 0.5-1% of the above mentioned solid cyclic aliphatic amines is added in NM liquid, the NM liquid color changes from the original light yellow color to light pink blue or blue, except hexamethylenetetramine where NM liquid color changes from the light yellow to clear yellow.

The present invention is a two component explosive composition and its formulation consists of fuel and oxidizer nitromethane liquid and a hexamethylenetetramine fuel in the form of a powder, or tablet, or its saturated solution in water. The present invention provides a simple novel device (method) for handling a two-component or two-part explosive product that includes a cylindrical bottle with a specially designed screw cap for receiving one component of the explosive material, such as liquid nitromethane. A removable cap is provided for sealing the bottle so that the bottle may be transported to the landmine site. At this site, the second of the two-component explosive material can be added into the liquid nitromethane bottle after removing the cap from the bottle. The cap is replaced and the bottle shaken until the sensitizing tablet or powder is dissolved in the liquid or the sensitizing water solution is mixed in the liquid. The cap is removed and replaced with a specially designed top screw-cap that holds the detonator in place, whether blasting cap No. 8, shock tube, detonator cord or time fuse.

Preferably, the bottle is composed of high density polyethylene (HDPE) so that the device may be placed directly on an AT mine, at the side of an AP mine without touching, or placed directly on mortar shells or bombs using a specially designed bottle holder. The stand is also suitable for proper placement of the explosive for effectively neutralizing above ground mines.

The present invention provides a third component to desensitize sensitized nitromethane and a method for accomplishing such desensitization. Desensitizing or neutralization is necessary if the binary explosive is prepared but goes unused. The neutralizer liquid is a high-boiling alkyl nitrate in which the alkyl contains greater than 3-carbons atoms. A preferred alkyl nitrate is 2-ethylhexyl nitrate ($C_8H_{17}NO_3$).

The present invention offers significant advantages in both HD and military application since non-explosives can be used to form the final explosive just prior to detonation. As a result, the subject invention has numerous advantages over the requirements regarding shipping, storage, etc., of C-4 and other explosives for demolition purposes. Many explosives are solids which are formed into a given shape in their manufacture and present shipping and storage restrictions. Since the components are non-explosives, no danger of premature accidental detonation exists until the solid fuel is added into the fuel or oxidizer liquid immediately prior to use. In the use of explosives for demining or clearing land mines, deminers generally use C-4 or TNT blocks. During shipment of C-4 or TNT, special precautions must be taken. Frequently, these precautions include limitations on the routing of the explosives and the type of carrier, to ensure secure and safe handling from shipper to recipient. The limitations as to the manner in which the explosives can be shipped and stored increase the cost for the explosive and explosive devices which must be borne by the ultimate user (deminers).

The addition of the solid fuel into liquid fuel or oxidizer is a fast, simple and safe procedure requiring no dynamic mixing since the solid powder or tablets or saturated solution of powder in water is easily soluble or mixed in liquid fuel. After sensitizing, the liquid explosive is not sensitive to friction or low impact, which makes sensitization of NM less hazardous. The two individual components of the explosive are safe, non-toxic, indefinitely storable, and are widely available and relatively inexpensive.

According to the present invention, the selection criteria of the component fuels, specifically the solid amines, are generally as follows:
Stability
High melting point
Good solubility in water (providing increased performance)
Shipping Requirements/DOT Classification
Toxicity and consequence for the environment
Ease of detonation
Availability
Cost Preliminary field tests comparison were made between several solid amines to produce a partial list of suggested additives that could be used in sensitizing NM to provide desired solubility, thermal stability and adequate density. We identified two additional families of compounds that are good candidates for sensitizing NM.

The use of solid aliphatic cyclic amines to sensitize nitromethane is particularly advantageous because the solid aliphatic cyclic amines are relatively harmless if spilled on the skin and thus do not present a toxicity problem to deminers handling the material. Another advantage is that NM sensitized with solid aliphatic cyclic amines has excellent shelf-life and does not deteriorate as does liquid amine sensitized NM.

This invention relates sensitization of nitroalkanes, especially nitromethane with solid amines especially HMTA liquid explosive used in device generally neutralization of surface exposed landmines and unexploded ordnances by high order.

According to the invention three fuels components are used, two of them are liquids and one is a solid. One liquid fuel works as an oxidizer and the solid fuel works as a sensitizer. Mixing these two components forms a powerful liquid explosive. The second fuel liquid is used for desensitizing liquid explosive.

BRIEF DESCRIPTION OF THE DRAWINGS

Additional advantages and features will become apparent as the subject invention becomes better understood by reference to the following detailed description when considered in conjunction with the accompanying drawings wherein:

FIG. 1A is a side view of a first small container containing premeasured flammable liquid nitromethane;

FIG. 1B is a side view of the second container, a small reusable vial containing solid fuel powder or a tablet or saturated solution of solid/soluble fuel in water;

FIG. 1C is a side view of combine kit mix of transferring the contents of FIG. 1B into container shown in FIG. 1A;

FIG. 1D shows the electric blasting cap fixed to the outside of the mixed container of FIG. 1C;

FIG. 1E is a side view of the combined kit, similar to FIG. 1C, with a changed screw cap that has a predrilled hole in center through which an electric basting cap has been inserted from top to dip into the liquid;

FIG. 1F is a side view of the combined kit similar to FIG. 1C, with a changed top screw-cap that has a predrilled hole in center through which a detonation cord has been inserted from top and double knotted and then dipped into the solution and the screw cap tightened.

FIG. 4A illustrates the transferring of powder or tablets or solution of solid/soluble fuel in water from the small vial to the nitromethane liquid container.

FIG. 4B illustrates tightening screw-cap on the nitromethane container;

FIG. 4C—illustrates shaking the nitromethane container until the contents are mixed.

FIG. 5 illustrates the inserting an electric blasting cap through the specially designed nozzle screw cap.

DETAILED DESCRIPTION

Figure 2A:
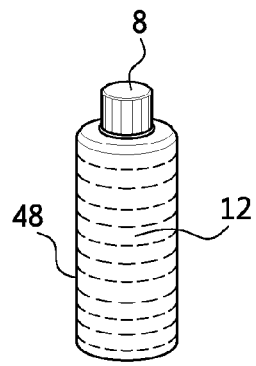
FIG. 2A is a side view of a medium cylindrical container containing premeasured flammable liquid nitromethane.

A low-cost, reliable and easy to use kit for neutralizing surface exposed landmine and unexploded ordnance for humanitarian demining is provided. The kit contains two non-explosive materials: a liquid fuel and a solid/soluble fuel. Both fuels are pre-measured in separate, sealed containers. The addition of a small quantity of solid/soluble fuel of (about 1% by weight) into the liquid creates an explosive. The resulting mixture is capable of detonating with a standard No. 8 blasting cap inserted through a specially designed screw cap. The solid/soluble fuel can be in the form of a powder, tablet, or its saturated solution in water. The solid/soluble fuel is hexamethylenetetramine in 6 mL sample vial. The liquid fuel, nitromethane, is provided in pre-measured quantities in three sizes of plastic bottle, 2 oz., 4 oz., and 8 oz. User is provided instructions for choosing the appropriate quantity of liquid fuel, the corresponding solid/soluble fuel required, the method of mixing, placement and detonation of the kits for neutralizing landmines and unexploded ordnance. Also disclosed is a simple wooden stand to hold the bottle of explosive in place for properly neutralizing above ground or surface-laid landmines and unexploded ordnance. A special fuel, liquid 2-ethylhexylnitrate, is provided to desensitize the mixed (sensitized) explosive, should the prepared explosive not be used.

The two-component liquid explosive of the present invention comprises a mixture of hexamethylenetetramine (HMTA), in the form of a powder, tablets or its saturated solution in water and nitromethane. In order to make the explosive compound, the two individual nonexplosive components, are simply added together in the proper proportion and shaken by hand. The resulting mixture is a clear, yellow liquid, and is detonable from 0-32° C. (32-90° F.) in a diameter of 1.5 cm or greater with a standard commercial No. 8 an electric blasting cap.

The HMTA powder or tablet or its saturated solution in water acts as sensitizer to the nitromethane, causing the liquid to become a standard blasting cap sensitive explosive. The preferred HMTA powder is obtained from Alfa Aesar (A Johnson Matthey Company), Ward Hill, Mass. Alfa Aesar's Stock Number is A17213 and is also known as hexamine or methenamine. Hexamethylenetetramine (HMTA) has been known over 130 years. It was the first organic molecule on which X-ray crystallography was performed. It is a heterocyclic organic compound that can be prepared by the reaction of formaldehyde and ammonia. Methenamine is more common in its medical uses and hexamine is more common in commercial uses. It was evaluated for acceptable daily intake as a food additive (as a preservative for fish, meat and pickles and cheeses). It decomposes gradually yielding ammonia and formaldehyde. It is used in vulcanization as an accelerator, in synthetic resins, in medicine as a diuretic and urinary antiseptic, as curing agents for phenolic and resorcinol resins, in fuel tablets for cooking, in the photographic industry as a stabilizer, as a corrosion inhibitor, in fungicides, as protein modifiers, as reagents in chemical analysis, and in the manufacture of the explosive RDX. It is not an explosive and has no explosive power. However, it is used as a basic raw material in slurry explosive. Technical details follow:

Chemical name: 1,3,5,7-tetraazatricyclo[3.3.1.13,7]decane

Chemical family: Tricyclic amine

CAS number: 100-97-0

Chemical formula: $C_6H_{12}N_4$

Density: 1.33 g/mL at 20° C. (68° F.)

Particle sizes: 80-800 micron

Solubility: soluble in water (0.85 g/mL), ethanol, acetone, chloroform and glycerin Boiling point: 285-295 C.° (545° F.-563° F.) (sublimes)

Melting point: 280° C. (536° F.)

Flash point: 250° C. (482° F.)

Auto ignition: 410° C. (770° F.)

Vapor pressure (mm Hg): 0.0035 at 20° C. (68° F.)

Decomposition Temperature: 800° C. (1472° F.)

Flammable solid Hazard class: 4.1 by the U.S. DOT.

Nitromethane (NM) is a colorless, oily, and a highly polar and optically anisotropic molecule; it is liquid in temperature range −28.5 to 101° C. (−19.3 to 213.8° F.) at room pressure, therefore, many complexities associated with solid materials can be avoided. It has mass density 1.13 g/mL at 25° C. (77° F.). All commercially available NM is never available at 100% of purity. It is an insensitive high explosive that serves as a good prototypical energetic material. It is also the simplest member of the family of nitrocompounds. NM was first prepared in 1872 by Kolbe and for many years was considered to be very stable compound. In 1938 Mckittrick and coworker reported that NM could be detonated under conditions of strong confinement. It has been known since the late 1940s that nitromethane can be sensitized toward detonation by the addition of small amounts of liquid amines. The mechanism of amine sensitization, although widely believed to be chemical in nature, is not well understood. Different hypotheses of sensitization were proposed but there is no agreement between these hypotheses. The sensitization of nitromethane mixtures decreases as the nitromethane aci-anion concentration increases. With small amounts of amines present, each amine molecule can form a complex with nitromethane molecules. The formation of this charge transfer complex weakens the nitrocompound C—N bond. A match will not ignite NM. It is an oxygen donating fuel, not reliant completely upon atmospheric oxygen for combustion. It is one of several compounds that decomposes exothermically and may be used as a monopropellant in small rocket thruster and demand gas generators. NiO/alumina as catalyst is effective in causing NM decomposition. This versatile chemical is used in a wide range of industrial applications including as a stabilizer for chlorinated hydrocarbons, a component for special fuels in internal combustion engines, a solvent for many chemical reactions such as polymerization, a corrosion inhibitor and raw material in the synthesis of many useful chemicals. It is used in making dyes and resins, re-crystallization solvent, polar solvent in synthesis, textile, surfactants, insecticides, pharmaceuticals, and is an ingredient in known prescription ulcer medication. NM is an ingredient in making binary and some explosives; however, under normal use it is not an explosive itself. It is not a fuel oil, but a volatile chemical used in top-fuel drag racing. NM is fairly innocuous when unconfined/uncompressed. It has a relatively high flash point, but is extremely explosive when pressurized or highly confined or at high temperature. Its detonation velocity is near that of RDX with the same density.

NM is one of the simplest organic explosives. The liquid explosives are homogenous in normal conditions. The activation energy of NM compressed by a shock wave is about 25 kcal/mole, i.e., half value for the gas-phase unimolecular decomposition. The detonation velocity of liquid explosives decreases linearly with respect to the reciprocal of the charge diameter and is nearly independent of the confinement nature. When inert particles are added to a liquid explosive such as NM, the detonation velocity and pressure are reduced since a portion of the chemical energy released goes to heating and accelerating the inert material. Adding a small number of inert heterogeneities such as solid particles or microballoons to NM also leads to a large increase in the sensitivity of NM. This sensitizing effect is due to the generation of hot-spots as a result of the interaction of the shock wave with the heterogeneities. The heterogeneous explosive is most insensitive (i.e., the failure diameter reaches a maximum). Pure NM packed with inert additives of small spherical glass and Al particles have reduced detonation velocities and critical diameter compared to the liquid explosive alone.

NM is a very stable liquid but it can be detonated under extraordinary conditions. When it does detonate, it is extremely powerful and is useful in many special applications. However, the difficulty in initiating detonation has long been a problem, often requiring expensive primers and boosters.

In NM, 19.3% by weight of water is miscible (soluble) at 70° C./158° F. Commercial NM is sometimes quite acidic. Due to the electron-withdrawing capability of the nitro group, the adjacent alpha-protons are acidic (pKa=10.2) and can be deprotonated with a strong base. It is a colorless, lucid liquid whose aqueous solution is acidic.

2-Ethylhexyl nitrate (2-EHN) is a high-boiling alkyl nitrate, in which the alkyl contains greater than 3 carbon atoms. It has a chemical formula $CH_3(CH_2)_3CH(C_2H_5)CH_2ONO_2$ and chemically related to nitroglycerin and ethylene glycol dinitrate. It undergoes a self-sustaining exothermic decomposition when it is heated above 100° C. (212° F.). Once established the decomposition reaction may be uncontrollable. It may contain traces of unreacted residual 2-ethylhexanol and/or water. It is colorless to pale yellow, a low viscosity liquid having a density of 0.96 g/mL at 20° C. (68° F.). It is combustible but it is not classified as a flammable liquid. It is stable at ambient temperature, however, it has a low autopignition temperature, and will decompose when heated above 100° C. (212° F.). It is mainly used in the petrochemical industry to increase the cetane number and the hexadecane value of diesel oil. It improves diesel engine performance, allowing quicker cold startup, diminution of engine startup noise, reduction in engine knock and wear, decrease or elimination of carbon build-up on injector nozzles and better fuel economy and engine life. Combustible liquid, Hazard class: 9 by the U.S. DOT.

The liquid EHN is obtained from Aldrich Chemical Company, Milwaukee, Wis.

Referring to FIGS. 1A and 1B, an exemplary kit according to the present invention includes the first container 4 with a capped opening 8, such as screw cap. The first container 4 is filled with a premeasured amount of nitromethane fuel, a light yellow liquid 12. The kit contains a second, smaller reusable container 16 with means of resealing 20 such as screw cap. In the embodiment shown FIGS. 1A and 1B, the second container 16 is a plastic vial containing solid fuel hexamethylene tetramine (HMTA), in the form of powder 24a, tablets 24b or its saturated solution in water 24c, which is capable of sensitizing flammable nitromethane to detonation.

FIG. 1C illustrates the exemplary embodiments of FIGS. 1A and 1B in combined form resulting in yellow liquid, a sensitized nitromethane 28. The solid powder fuel HMTA, a powder 24a, or tablets 24b or saturated solution in water 24c has been transferred from the second container 16 into the first container 4 and the container has been resealed 8 and shaken.

In FIG. 1D, an exemplary initiation system 32 has been affixed to the outside of the first container 4, using electrical tape 36. In this embodiment the initiation system 32 consists of an electric blasting cap of No. 8 strength.

FIG. 1E illustrates another exemplary method of attaching the initiation system 32 to this embodiment, where screw cap 8 of the first container 4 has been replaced with a screw cap with a pre-drilled hole in the center 40. The initiation system 32 has been inserted through the hole 40 until it dips into the sensitized nitromethane 28.

FIG. 1F illustrates a third exemplary method of initiation that may be used. Detonation cord 44, containing 55 grains (0.065 g) of pentaerythrol tetranitrate (PETN) explosive per foot, is inserted through the screw-cap hole 40 and knotted twice at the end of the cord and the knot is dipped into the sensitized NM 28.

Figure 2B:
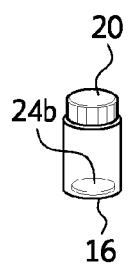
FIG. 2B is a side view of a second container, a small reusable vial containing solid fuel tablets.

Referring to FIGS. 2A and 2B, an exemplary kit according to the present invention includes the first container 48 with a capped opening 8, such as screw-top cap. The first container 48 is filled with a premeasured amount of nitromethane fuel, a light yellow liquid 12. The exemplary kit contains a second, smaller reusable container 16 with means of resealing 20 such as top screw cap. In the embodiment shown FIGS. 2A and 2B, the second container 16 is a plastic vial containing solid fuel HMTA, in the form of tablets 24b, which is capable of sensitizing flammable nitromethane to detonation.

Figure 2C:
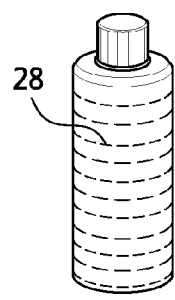
FIG. 2C is a side view of the combined kit, tablets from the small sample vial in FIG. 2B into the container in FIG. 2A.

FIG. 2C illustrates the exemplary embodiments of FIGS. 2A and 2B in combined form resulting in yellow liquid, a sensitized nitromethane 28. The solid fuel tablets of HMTA 24b has been transferred from the second container 16 into the first container 48 and the container has been resealed 8 and shaken.

Figure 2D:
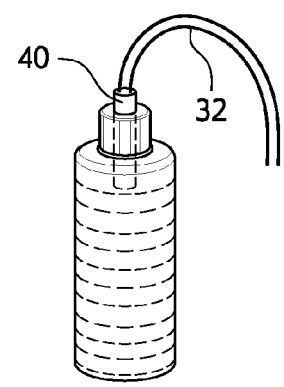
FIG. 2D is a view of the combined solution in the container of FIG. 2A with the top replaced with a pre-drilled hole in the center, though which an electric cap is inserted from top until it dips into liquid.

FIG. 2D illustrates an initiation system 32 embodiment to this exemplary embodiment, where screw cap 8 of the first container 48 has been replaced with a screw cap with a pre-drilled hole in the center 40. The initiation system 32 has been inserted through the hole 40 until it dips into the sensitized nitromethane.

Figure 3A:
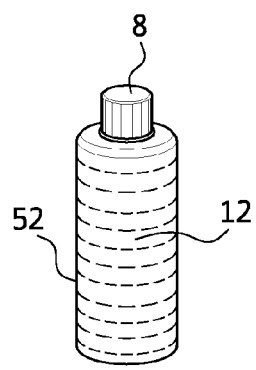
FIG. 3A is a side view of a large container of premeasured flammable liquid nitromethane.
Figure 3B:
FIG. 3B is a view of the second small container, a vial containing a saturated solution of solid fuel powder in water.

Referring to FIGS. 3A and 3B, another exemplary kit according to the present invention includes the first container 52 with a capped opening 8, such as screw cap. The first container 52 is filled with a premeasured amount of nitromethane fuel, a light yellow liquid 12. The exemplary kit contains a second, smaller reusable container 16 with means of resealing 20 such as screw cap. In the embodiment shown FIGS. 3A and 3B, the second container 16 is a plastic vial containing saturated solution of solid fuel HMTA in water 24c, which is capable of sensitizing flammable nitromethane to detonation.

Figure 3C:
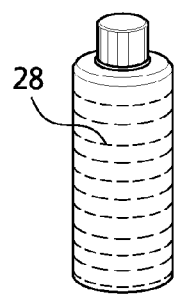
FIG. 3C is a side view of the combined kit made by transferring the water solution of solid/soluble fuel into the container shown in FIG. 3A.

FIG. 3C illustrates the exemplary embodiments of FIGS. 3A and 3B in combined form resulting in light green liquid, a sensitized nitromethane 28. The saturated solution of solid fuel HMTA in water 24c has been transferred from the second container 16 into the first container 52 and the container has been resealed 8 and shaken.

Figure 3D:
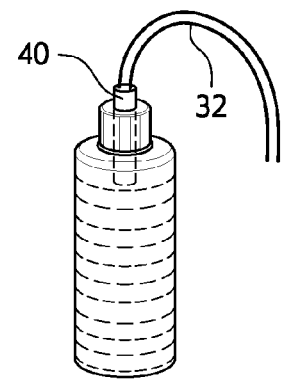
FIG. 3D shows the completed kit of FIG. 3C with the cap replaced by one with a pre-drilled a central hole, through which an electric basting cap is inserted from top.

FIG. 3D illustrates initiation system 32 to this embodiment, where screw cap 8 of the first container 52 has been replaced with a screw cap with a pre-drilled hole in the center 40. The initiation system 32 has been inserted through the hole 40 until it dips into the sensitized nitromethane.

In use, the second container 16 is transferred into the first container 4 as illustrated in FIG. 4A. The top screw-cap 8 is tightening as illustrated in FIG. 4B. The first container 4 is shaken to dissolve powder or tablets or mixing of saturated solution of powder in water as illustrated in FIG. 4C. On mixing color of solution changed from original light yellow to yellow when powder or tablets are used. If a saturated solution of powder in water is used, the original light yellow will change to light green. The nitromethane liquid is sensitized and ready for application. Now change screw cap with a cap with a center hole. An initiation system 32, such as an electric blasting cap No. 8 strength is then inserted through the screw cap as illustrated in FIG. 5.

In the present invention consists of inexpensive commercially available products. In one exemplary embodiment, the first container 4, 48 and 52 is a commercially available plastic container (2, 4 and 8 oz. bottles) with a screw cap, with and without hole. The second reusable small container 16 with resealing means 20 may be plastic vial with screw cap.

In an alternative exemplary embodiment commercially available container 4, 48 and 52 and chemical 24 and stand may be substituted with custom manufactured containers, solid chemical and stand.

Figure 6:
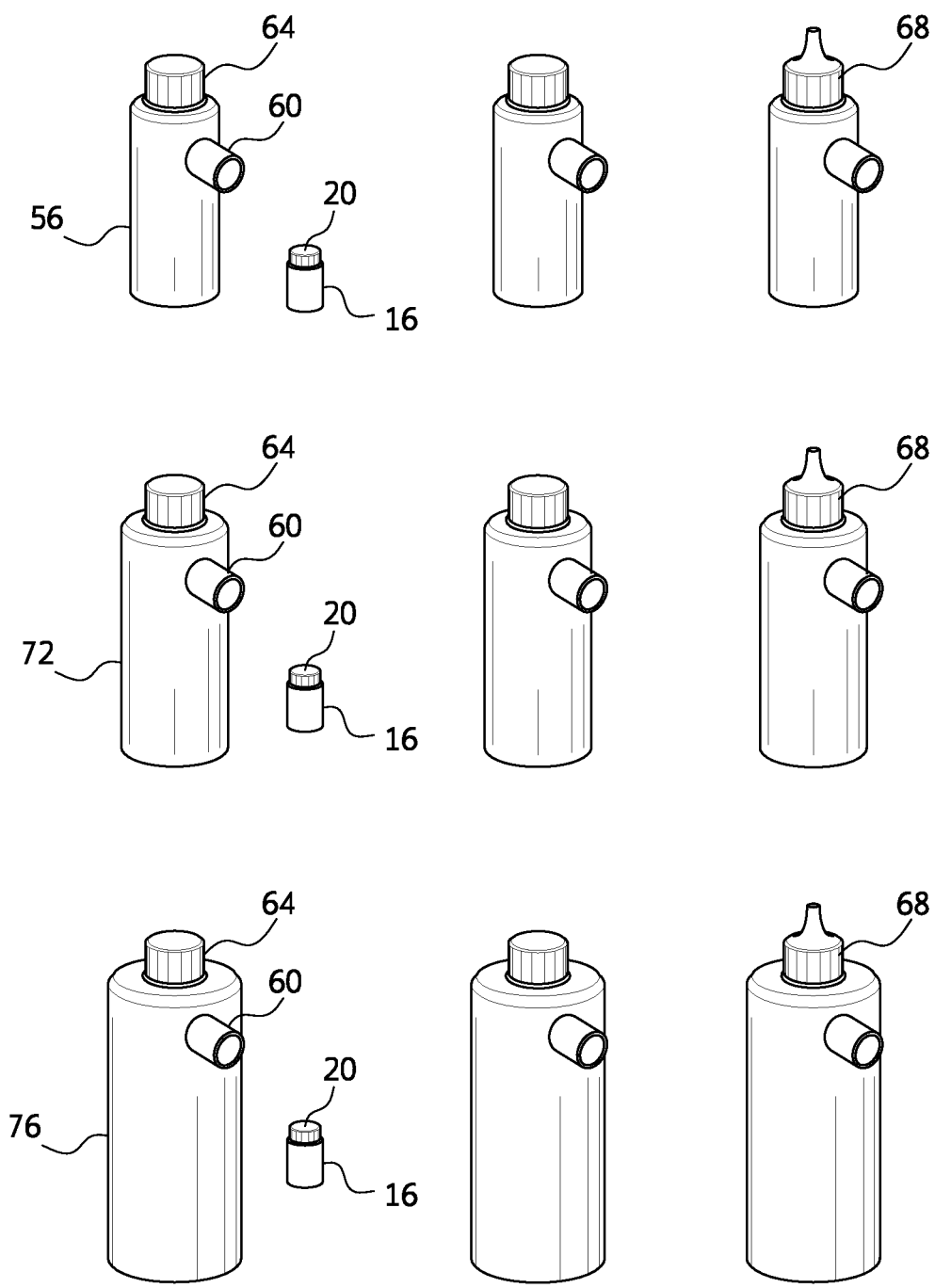
FIG. 6 illustrates the specially fabricated bottle with a nozzle screw-cap and a molded socket on the side to hold the bottle on the stand.

In the illustrated FIG. 6 another embodiment, the three sizes of plastic bottles will be custom manufactured to have capacity 75, 150 and 300 mL with dimension 9.2 cm height, 3.4 cm diameter, 11.6 cm height and 4.1 cm diameter, 15.4 cm height and 5.1 cm diameter, of container 56, 72 and 76 respectively. Each size of bottle has a plastic socket 60 on the side near the top, 1 cm long and 0.5 cm diameter. The molded socket, identical on each size of bottle, is the junction between the bottle and the stand. The three sized bottles have identical threaded openings, 2 cm diameter, in order that the screw caps 64 and screw cap with nozzle 68 may be exchanged among the bottles. Two types of threaded caps fit on the bottles. One is a closed cap 64 to seal the bottle. The second cap has a small tubed opening or nozzle 68, 2 cm in length. The nozzle, with an opening 0.7 to 0.75 cm, allows for the insertion and stabilization of an electric blast cap No. 8. The nozzle will ensure the electric blasting cap remains in the center of the solution, which is an important to get reliable performance of liquid explosive. The depth to which the blasting cap is inserted can be adjusted as needed and secured with a piece of tape to the nozzle and blasting cap.

The chemical available in powder form can be pressed into tablets. Each tablet may weigh around one gram and the approximate diameter is one cm. The tablets can be bottled in appropriate quantities or packed individually in foil or blister packs similar to medicine tablets.

Figure 7:
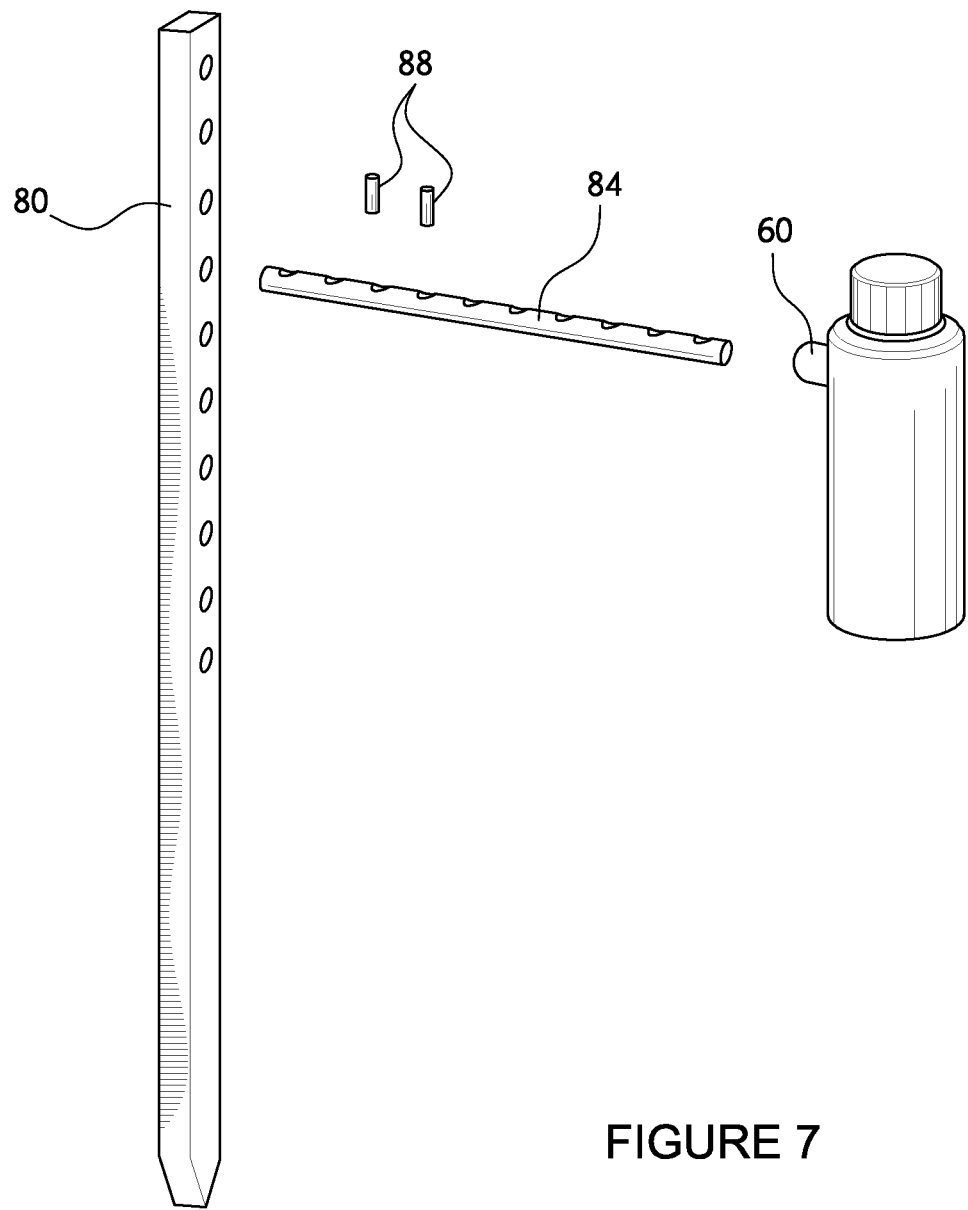
FIG. 7 illustrates the design of the wooden stand.

Yet another objective of the present invention is to provide a delivery system for liquid explosive filled that does not introduce metal debris into mined area and allows the liquid explosive bottle to be electrically initiated remotely from a safe distance. This delivery system is a single shot apparatus. The stake is driven into the soil near the target. One end of the dowel is inserted into bottle socket as illustrated in FIG. 6 and other end of the dowel is inserted into the stake. The dowel's length is fixed by inserting a plastic pin into a hole in the dowel closest to the stake. Once the bottle distance is fixed, the bottle can rotate on the dowel to aim with respect to the neutralizing target. The delivery system will be useful to attack mines above ground or mines from the top. The custom-made delivery system or stand as illustrated FIG. 7 is comprised of three components: stake 80, dowel 84 and plastic pin 88. The stake may be made from wood having dimensions 45 cm long, 2 cm wide and 1 cm thick. The stake may have 0.5 cm diameter holes along the length at 2.5 cm intervals, designed for the insertion of the dowel at various heights. The dowel may be made from wood, 20 cm long and 0.5 cm diameter. The end of the dowel fits the molded socket 60 on the side of the bottles. The dowel may have several small holes around 0.2 cm diameter, allowing for the pin to secure the dowel in the stake. The several small holes in the dowel allow for adjustment of the horizontal distance between the stake and the bottle containing the liquid explosive positioned near the neutralization target.

The explosive of the present invention preferably includes three sizes of bottles and three small vials to contain the nitromethane and HMTA powder or tablets or its saturated solution in water. The bottles are preferably recappable, so that they may be opened to receive the HMTA powder or tablets or its saturated solution in water and nitromethane and then be tightly recapped. The bottle may be constructed in various specific sizes and designs out of various materials, depending on specific use. The bottle may be cylindrical.

The explosive may be designed as a mine clearing charge or an unexploded ordnance charge or may be used as a demolition charge or various military applications.

The mixture should contain a minimum of 0.5% of HMTA powder in relation to NM by weight. The preferred mixture is about 0.7 to 1.4 g of HMTA powder to 100 g of nitromethane. Thymol blue a sensitive indicator dye is added into nitromethane for sensing basic compound. This mixture is a clear yellow liquid and is easily pourable. Several tests were conducted by preparing the mixture of NM and HMTA in two oz. plastic bottles by increasing concentration of HMTA 1.8, 9.24 and 18.15% by weight in NM. At lower concentrations of HMTA, the HMTA dissolved in NM to produce a clear yellow liquid. At 9.24% concentration, HMTA was partially dissolved in NM producing a green liquid with undissolved HMTA particles settling at the bottom. At a high concentration (18.15%) of HMTA in NM, HMTA was partially dissolved in NM, producing a pink-blue liquid with undissolved particles of HMTA settled at the bottom. Explosive tests were performed on these samples using ½" thick aluminum witness plates and No. 8 blasting caps. For each test the witness plate was placed on 4 inch lengths of 2"×4" wood and the bottle was placed in the center of the witness plate. The blasting cap was inserted through a drilled hole in the cap to dip into the liquid. The electric cap was connected to a demolition device via electric wires. When the electric cap was initiated, the NM liquid was detonated, penetrating the ½" thick aluminum witness plate. This test was carried out on each of the three HTMA/NM concentration samples. The resulting holes in the witness plates were measured on the top side of the plate and the bottom side of the plate. From the measured data it is clear that as concentration of HMTA increases in NM, the penetration diameter decreases, especially the bottom diameter. The bottom diameters on the aluminum witness plates were 4.1, 1.7 and 0.5 cm for 1.81, 9.24 and 18.15% HMTA in NM, respectively. This invention suggests that as the concentration of HMTA in NM increases the performance of NM explosive decreases. Therefore selection of suitable concentration of HMTA is very important to ensure optimal performance of NM.

The method of making the two component liquid explosives of the present invention includes steps of providing a premeasured tablet size and amount or quantity of HMTA powder or amount of saturated solution of HMTA powder in water and providing a premeasured quantity of NM and providing instructions for proper mixing.

There is only one suitable method of mixing the composition. The first method is by packaging the proper amount of HMTA powder or number of HMTA tablets in the vial or certain amount of saturated solution of HMTA in water and the proper quantity of NM in the bottle. The user opens the screw cap of the NM-filled bottle, adds powder or tablets into the bottle, recaps the bottle tightly and shakes the bottle until the HMTA is dissolved in NM and the color of the mixture is light yellow to yellow. Then the mixture is an explosive and is ready for use. The size of the bottle and amount of NM and HMTA is important for various applications in humanitarian demining.

It has been found that this explosive performed well when it is used in a cyclinderical plastic bottle with 3.5 cm diameter due to focusing energy in vertical direction. Prepared 1% solution of HMTA stock solution by dissolving 5 g of HMTA in 500 g NM in 16 oz. plastic bottle. Several experiments were conducted, transferring 70 g, 140 g, and 280 g of stock solution in 2, 4 and 8 oz. plastic bottles respectively. The 2 oz. bottle was placed on ½" thick aluminum plate, the 4 oz. bottle was placed on ¼" thick steel witness plate and the 8 oz. bottle was placed on ½" thick steel witness plate. The initiations of liquid explosive experiments were performed as described previously. The ½" thick aluminum witness plate, ¼" and ½" thick steel witness plates were penetrated completely by 70 g, 140 g and 280 g NM solution respectively.

A test was conducted on three samples of HMTA/NM using same quantity of powder HMTA in and two placements of the blasting cap and detonator cord. Three samples were prepared by adding about 0.8 g of HMTA powder into 70 g of NM in each 2 oz. plastic bottle. The samples were numbered 1, 2, and 3. Each sample bottle was closed with screw cap and shaken until the HMTA power was dissolved in the NM. Explosive tests were performed on these samples using ½" thick aluminum witness plates and #8 blasting caps and detonator cord. For each test the witness plate was placed on 4 inch lengths of 2"×4" wood and the bottle was placed in the center of the witness plate. For the first sample, the blasting cap was attached to side of the bottle with electrical tape (FIG. 1-D). In the second sample, the blasting cap was inserted through a drilled hole in the cap to dip into the liquid (FIG. 1-E). In the third sample, the cap was removed, detonation cord was inserted through a drilled hole in the cap and double knotted at the end, and then the cap was replaced on the bottle, dipping the knotted detonation cord into the liquid contents. The detonation cord was connected to a blasting electric cap, which was then connected to the demolition device via electric wires (FIG. 1-F). The blasting caps of sample 1 and 2 were connected to the demolition device via electric wires. When the blasting cap was initiated on each sample, the NM liquid detonated, penetrating the ½" thick aluminum witness plate. The resulting holes in the witness plates were measured on the top and bottom surfaces of each plate. The top and bottom diameters of the three witness plates were nearly identical, suggesting that the resulting explosive is equally powerful regardless of the placement of the blasting cap and the initiation method. The testing also suggests that both placements of the blasting cap or detonator cord are equally effective.

A test was conducted on three samples of HMTA/NM using same quantity of HMTA in various forms, powder, tablet and liquid. Three samples were prepared using about 70 g of NM in each 2 oz. plastic bottle. Into the three bottles was added 0.8 g of HMTA powder, 0.8 g of HMTA tablet and 0.8 g of HMTA powder dissolved in 1 ml of water; sample number 1, 2 and 3, respectively. Each sample bottle was closed with the screw cap and shaken until the HMTA (power, tablet or water solution) was dissolved or mixed in the NM. Explosive tests were performed on these samples using ½" thick aluminum witness plates and #8 blasting caps. For each test the witness plate was placed on 4 inch lengths of 2"×4" wood and the bottle was placed in the center of the witness plate. In all samples of HTMA in NM, the blasting cap was inserted through a drilled hole in the cap to dip into the liquid, which was then connected to the demolition device via electric wires. When electric cap was initiated on each sample, the NM liquid detonated, penetrating the ½" thick aluminum witness plate. The resulting holes in the witness plates were measured on the top and bottom surfaces of each plate. The top and bottom diameters of the three witness plates were nearly identical, suggesting that the resulting explosive is equally powerful using the powder, tablet or water solution of HMTA.

EXAMPLE 1

Figure 8:
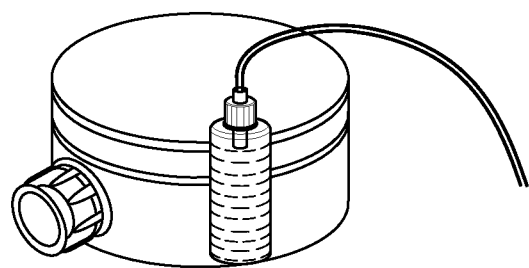
FIG. 8 illustrates placing the assembled kit adjacent to but without touching an AP landmine.

The screw cap of a two oz. plastic cylindrical bottle containing 70.0 g of NM was removed and one gram powder of HMTA or one tablet from the vial was added into the bottle. The bottle was recapped and the bottle was shaken until the powder or tablet dissolved in NM. On dissolving HMTA in NM, the NM liquid color changed from light yellow to yellow. The bottle was placed next to, but not touching (FIG. 8), the most widely used mine in the world, a surface-exposed large round plastic case AP blast mine containing 249 g (0.249 kg) of TNT. The bottle's screw cap was replaced with a second screw cap with center hole for inserting a No. 8 blasting cap. The blasting cap was inserted from the top until it dipped into the NM liquid. The blasting cap was connected to a demolition device via electrical wires. On remote initiation of the blasting cap, the NM detonated creating an intense shock wave that detonated the AP mine by sympathetic detonation. The blast of the mine created a medium sized crater.

EXAMPLE 2

Figure 9:
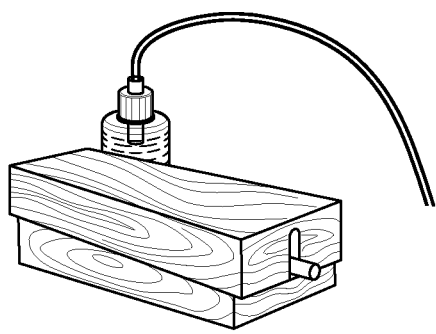
FIG. 9 illustrates placing the assembled kit adjacent to but without touching an AP wooden case blast landmine.

A 2 oz. cylindrical plastic bottle contained 70 g of NM. The screw cap of the bottle was removed and HMTA powder or tablet added from the vial. Recapped the bottle and shook the bottle a few times until tablet or powder was dissolved in the NM. On dissolving powder or tablet of HMTA, the NM original color was changed from light yellow to yellow. The screw cap was replaced with one with a center hole for inserting the blasting cap. The bottle was placed against, without touching mine case (FIG. 9), a rectangular wooden case AP mine containing 200 g (0.2 kg) of TNT. A blasting cap was inserted from top into the NM liquid and it was connected to demolition firing device via electrical wires. On initiation of electric cap, the NM detonated, generating a powerful shock wave that detonated the mine sympathetically and created a medium size crater.

EXAMPLE 3

Figure 10:
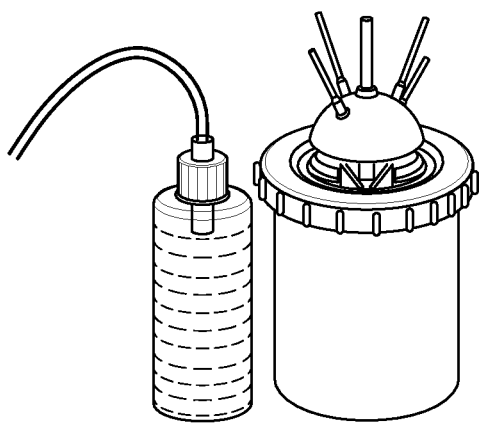
FIG. 10 illustrates placing the assembled kit adjacent to but without touching an AP plastic case bounding mine.

In this example, the screw cap of a four oz. plastic cylindrical bottle containing 140 g of NM was removed and two gram powder of HMTA or two tablets from the vial was added into the bottle. The bottle was recapped and the bottle was shaken until the powder or tablets dissolved in NM. On dissolving HMTA in NM, the NM liquid color changed from light yellow to yellow. The surface exposed a large cylindrical plastic case bounding AP mine containing 420 g (0.42 kg) of comp. B was attack from the side of the mine without touching the pressure fuse (FIG. 10). The bottle's screw cap was replaced with a second screw cap a center hole for inserting a No. 8 blasting cap. The blasting cap was inserted from the top until it dipped into the NM liquid. The blasting cap was connected to a demolition firing device via electrical wires. On initiation of the blasting cap remotely, the NM detonated creating an intense shock wave that detonated the AP bounding mine without bounding by sympathetic detonation. The blast of the mine created a medium sized crater.

EXAMPLE 4

Figure 11:
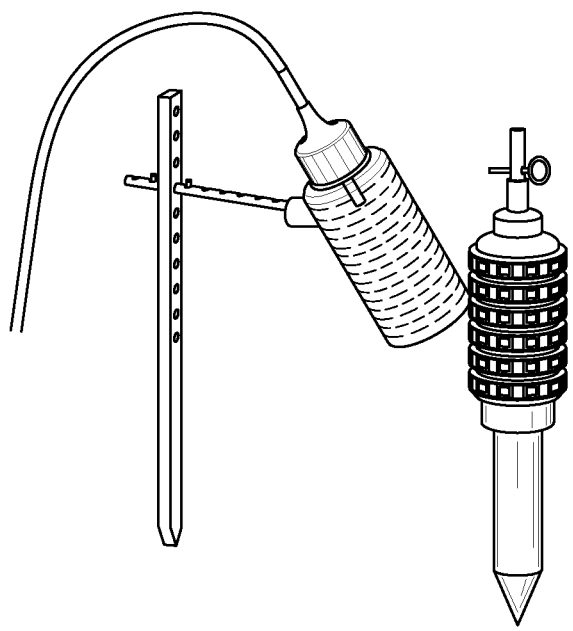
FIG. 11 illustrates placing the assembled kit using the specially designed stand to attack an AP stake land mine from an angle.

In this example, the screw cap of a four oz. plastic cylindrical bottle containing 280 g of NM was removed and 4 g powder of HMTA or four tablets from the vial was added into the bottle. The bottle was recapped and the bottle was shaken until the powder or tablets dissolved in NM. On dissolving HMTA in NM, the NM liquid color changed from light yellow to yellow. The bottle has on its side a specially designed plastic socket to attach the wooden stand as shown in FIG. 11. The target AP stake mine has a very thick, flat-topped wooden stake that acts as the picket and allows the mine to be positioned above ground level. The body is cast iron and contains 75-100 g (0.075-0.1 kg) of TNT. The attack must be from the side of mine at an angle without touching the case. The bottle's screw cap was replaced with a second screw cap specially designed to hold in position a No. 8 blasting cap. The blasting cap was inserted from the top until it dipped into the NM liquid. The blasting cap was connected to a demolition firing device via electrical wires. On initiation of the blasting cap remotely, the NM detonated creating an intense shock wave that detonated the AP stake mine by sympathetic detonation. The blast of the mine created a blast above ground, therefore no crater in the ground.

EXAMPLE 5

Figure 12:
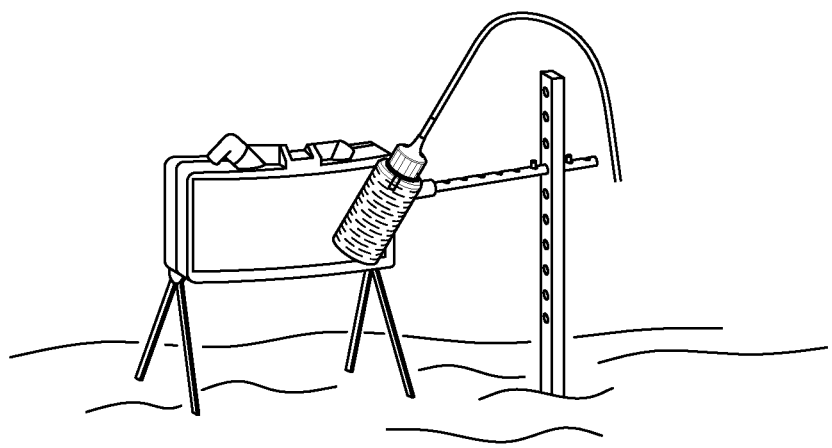
FIG. 12 illustrates placing the assembled kit attacking a Claymore AP directional scatterable landmine using the specially designed stand.

In this example, the screw cap of a two oz. plastic cylindrical bottle containing 70.0 g of NM was removed and one gram powder of HMTA or one tablet from the vial was added into the bottle. The bottle was recapped and the bottle was shaken until the powder or tablet dissolved in NM. On dissolving HMTA in NM, the NM liquid color changed from light yellow to yellow. The side of the bottle has a specially designed plastic socket to attach it to a wooden stand, as shown in FIG. 12. The bottle was positioned on the concave side of a Claymore mine, at a 45 degree angle without touching the case of the mine. The Claymore, an AP Fixed Direction Fragmentation mine often used for protective and ambush purposes, has a molded plastic case with a convex front and concave rear and contains 628 g (0.628 kg C-4) plastic explosive. The bottle's screw cap was replaced with a second screw cap specially designed to hold in position a No. 8 blasting cap. The blasting cap was inserted in the top until it dipped into the NM liquid. The blasting cap was connected to a demolition firing device via electrical wires. On remote initiation of the blasting cap, the NM detonated creating an intense shock wave that detonated the AP fixed directional fragmentation mine by sympathetic detonation. The blast of the mine was above ground, therefore no crater in the ground was found.

EXAMPLE 6

Figure 13:
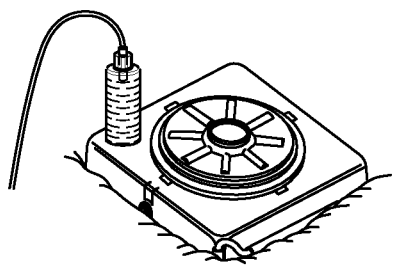
FIG. 13 illustrates placing the assembled kit directly on an AT plastic case landmine.

In this example, the screw cap of a four oz. plastic cylindrical bottle containing 140.0 g of NM was removed and two gram powder of HMTA or two tablets from the vial was added into the bottle. The bottle was recapped and the bottle was shaken until the tablets or powder dissolved in NM. On dissolving HMTA in NM, the NM liquid color changed from light yellow to yellow. The bottle's screw cap was replaced with a second screw cap specially designed to hold in position a No. 8 blasting cap. The bottle was placed on top of mine case as shown in FIG. 13 of surface exposed unfused AT plastic case mine which contains approximately 9530 g (9.53 kg) Comp B as a main charge. The basting cap was inserted in the top of the bottle until it dipped into the NM liquid. The blasting cap was connected to a demolition firing device via electrical wires. On remote initiation of the blasting cap, the NM detonated creating an intense shock wave that detonated the AT blast mine by sympathetic detonation. The blast of the AT mine generated a large crater in the ground due to the large quantity of explosive present in the mine.

EXAMPLE 7

Figure 14:
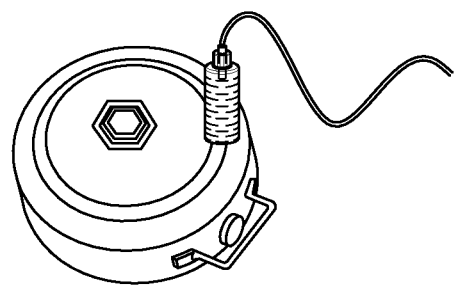
FIG. 14 illustrates placing the assembled kit directly on an AT metal case landmine.

In this example, the screw cap of a four oz. plastic cylindrical bottle containing 140.0 g of NM was removed and two gram of HMTA or two tablets from the vial was added into the bottle. The bottle was recapped and the bottle was shaken until the powder or tablets dissolved in NM. On dissolving HMTA in NM, the NM liquid color changed from light yellow to yellow, the NM is sensitized and is ready to use as an explosive. The bottle's screw cap was replaced with a second screw cap with a center hole for inserting a No. 8 blasting cap. The bottle was placed on the top of surface exposed unfused AT metallic case mine as shown FIG. 14 which contains approximately 5700 g (5.7 kg) of TNT as main charge. The basting cap was inserted in the top of the bottle until it dipped into the NM liquid. The blasting cap was connected to a demolition firing device via electrical wires. On remote initiation of the blasting cap, the NM detonated creating an intense shock wave that detonated the AT blast mine by sympathetic detonation. The blast of the AT mine generated a large crater in the ground due to the large quantity of explosive present in the mine.

EXAMPLE 8

Figure 15:
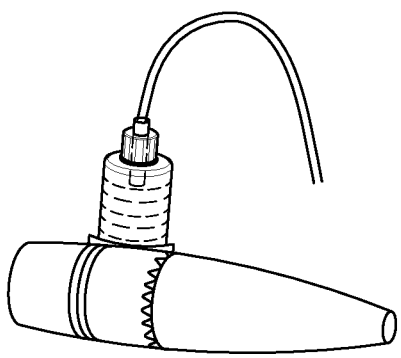
FIG. 15 illustrates placing a large assembled kit directly on 155 mortar shell using specially designed large kit holder.

In this example, the screw cap of an eight oz. plastic cylindrical bottle containing 280.0 g of NM was removed and four gram powder of HMTA or four tablets from the vial was added into the bottle. The bottle was recapped and the bottle was shaken until the powder or tablets dissolved in NM. On dissolving HMTA in NM, the NM liquid color changed from light yellow to yellow. The bottle's screw cap was replaced with a second screw cap with center hole for inserting a No. 8 blasting cap. A specially designed bottle holder (5.5 cm diameter and 2.5 cm length) of PVC tube was placed and taped to the side of a surface-exposed unfused 155 mm artillery projectile, as shown in FIG. 15 The projectile contains 6530 g (6.53 kg) Comp B or TNT as main charge. The thickness of the projectile metal case varies from ½" to 1". The bottle was placed in the bottle holder. The basting cap was inserted in the top until it dipped into the NM liquid. The blasting cap was connected to a demolition firing device via electrical wires. On remote initiation of the blasting cap, the NM detonated creating an intense shock wave that detonated the artillery projectile by sympathetic detonation. The blast of the artillery projectile generated a large crater on ground due to the large quantity of explosive present in the artillery projectile.

It is obvious that many modifications and variations of the present invention are possible in light of the above teachings. It is therefore to be understood that within the scope of the appended claims, the invention may be practiced otherwise than as described.

What is claimed is:

1. A field mixable two-component liquid explosive kit, comprising:
   a range of 1-4 grams of non-explosive soluble component based on hexamethylenetetramine in a vial the size of 6 mL; and
   a range of 70-280 grams of a non-cap sensitive liquid component based on nitromethane in a plastic bottle having a sealable volume of either 2 oz., 4 oz., or 8 oz. appropriately chosen to adequately contain the liquid component and a subsequent component mixture, wherein said soluble and liquid components are combinable for mixing in the plastic bottle prior to field use to produce a cap sensitive explosive.

2. The field mixable two-component liquid explosive kit of claim 1, wherein said soluble component based on hexamethylenetetramine is of a powder form having an average particle size range of 80 to 800 microns for mixing in the ratio by weight of 1 to 2 grams of hexamethylenetetramine powder to 99 to 98 grams of said nitromethane to produce a cap sensitive explosive in the field.

3. The field mixable two-component liquid explosive kit of claim 1, wherein said soluble component based on hexamethylenetetramine is of a tablet form having a diameter of one cm, wherein a one gram tablet of said hexamethylenetetramine is used to add to 100 grams of said nitromethane by weight.

4. The field mixable two-component liquid explosive kit of claim 1, wherein said soluble component based on hexamethylenetetramine is capable of dissolving in water.

5. A field mixable two-component liquid explosive kit, comprising:
   a range of 1-4 grams of non-explosive soluble component based on hexamethylenetetramine in a vial the size of 6 mL; and
   a range of 70-280 grams of a non-cap sensitive liquid component based on nitromethane in a plastic bottle having a sealable volume of either 2 oz., 4 oz., or 8 oz. appropriately chosen to adequately contain the liquid component and a subsequent component mixture, wherein said soluble component based on hexamethylenetetramine is a saturated solution in water for mixing in the plastic bottle of a ratio of one to two grams said saturated solution of hexamethylenetetramine to 98 to 99 grams of said nitromethane to field produce a cap sensitive explosive.

6. A field mixable two-component liquid explosive kit with a desensitizer, comprising:
   a range of 1-4 grams of non-explosive soluble component based on hexamethylenetetramine in a vial the size of 6 mL; and
   a range of 70-280 grams of a non-cap sensitive liquid component based on nitromethane in a plastic bottle having a sealable volume of either 2 oz., 4 oz., or 8 oz. appropriately chosen to contain the liquid component and subsequent component mixtures, wherein said soluble and liquid components are combinable for mixing in the plastic bottle to field produce an explosive of nitromethane; and
   a 2-ethylhexylnitrate liquid for mixing with said explosive of nitromethane in the ratio of about 1 gram of 2-ethylhexylnitrate liquid to 9 grams said nitromethane explosive by weight to desensitize said field mixable two-component explosive.

* * * * *